Figure 1:
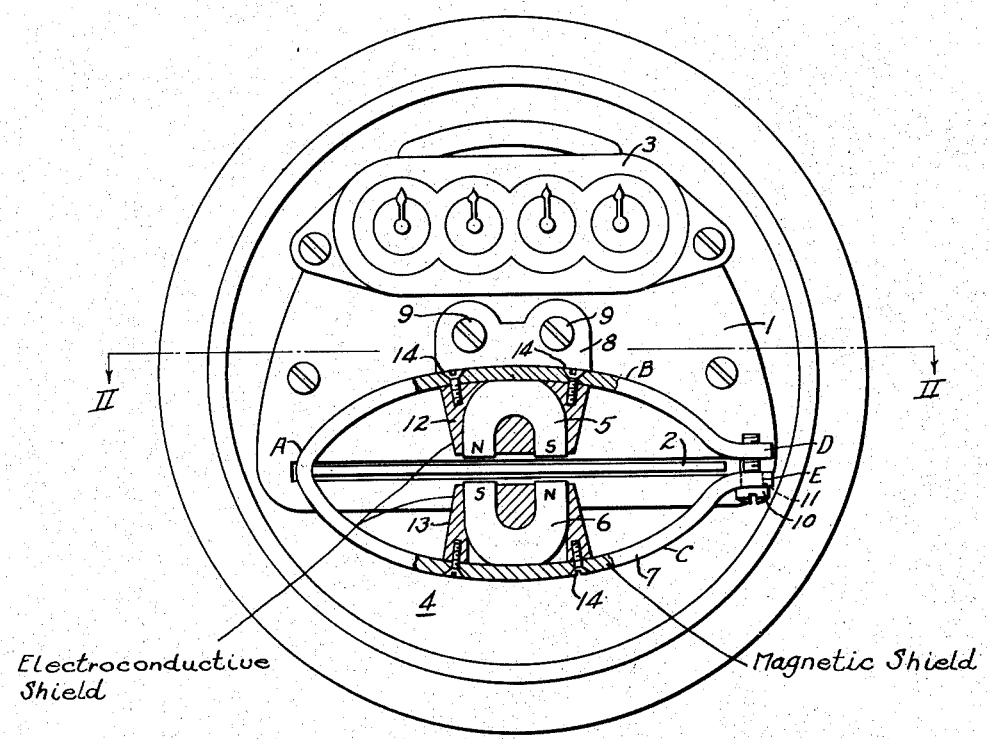

June 2, 1942.  T. D. BARNES  2,284,893

ELECTRICAL MEASURING INSTRUMENT

Filed Jan. 5, 1940

Electroconductive Shield

Magnetic Shield

WITNESSES:
Leon M. Garman
C. L. Freedman

INVENTOR
Thomas D. Barnes.
BY
ATTORNEY

Patented June 2, 1942

2,284,893

UNITED STATES PATENT OFFICE 2,284,893

ELECTRICAL MEASURING INSTRUMENT

Thomas D. Barnes, West Orange, N. J., assignor to Westinghouse Electric & Manufacturing Company, East Pittsburgh, Pa., a corporation of Pennnylvania Application January 5, 1940, Serial No. 312,526

8 Claims. (Cl. 171—34)

This invention relates to electrical measuring instruments, and it has particular relation to damping magnet units for such instruments.

In many electrical measuring instruments, such as watthour meters, it is common practice to employ damping magnets for providing a torque to oppose rotation of an electroconductive armature. For accurate measurements, it is necessary that the damping magnets permit of accurate calibration, and that they retain this calibration during the operating life of the instrument. This is for the reason that errors appearing in the damping magnets are cumulative and persist for the entire duration of the instrument operation.

Most of the damping magnets at present in service are formed of chromium or tungsten steel. When properly shielded, such magnets may be calibrated and retain the calibration for long periods of time.

Recently a number of high-coercive magnet steels have become available. Typical examples of such steels are cobalt magnet steels, which may contain approximately 36% cobalt, and the aluminum-nickel steels, which may, for example, contain 20% aluminum, 12% nickel and 5% cobalt. These high-coercive steels have coercive forces above 180 oersteds and permit an appreciable saving in weight and space of a damping magnet unit. Such savings are of extreme importance in the design of many instruments, such as watthour meters.

Because of their high coercive forces and short lengths, the high-coercive magnet steels are extremely critical as to adjustment and for this reason, an accurate and fine adjustment is essential.

For many years it has been believed that high-coercive magnet steels are unusually resistant to the demagnetizing action of external magnetic fields. Consequently, it was thought that such steels would eliminate any trouble from external fields when employed as damping magnets. I have found, however, that the high-coercive magnet steels have peculiar actions when subjected to external magnetizing fields. Under some conditions, the external magnetizing field may result in an apparent increase in the damping action of a high coercive damping magnet. Under other conditions, an apparent decrease in damping torque is obtained. This is apparently due to changes in the ratio of working or effective flux to the leakage flux, resulting from cross-magnetization. Needless to say, such variations are highly objectionable in measuring instruments.

In accordance with my invention, a high-coercive damping magnet is placed adjacent each face of an electroconductive armature which is to be damped. Preferably, for optimum results, the magnets are so proportioned that the entire magnetic path provided thereby approximates a circle. For adjusting the permanent magnets, I mount each magnet on one leg of a U-shaped supporting member, which is formed preferably of resilient material. The free ends of the U-shaped supporting member are adjustably related by an adjusting mechanism through which the damping magnets may be adjusted for calibration purposes. For shielding the permanent magnets against the effects of external magnetic fields, particularly continuous and low frequency fluctuating fields, the supporting member may be constructed of a magnetic material. As a protection against alternating external magnetic fields, and particularly high frequency fluctuating fields, each of the damping magnets may be substantially embedded in an electroconductive shield.

It is, therefore, an object of my invention to provide an improved mounting for damping magnets.

It is another object of my invention to provide a resilient support for damping magnets which may be distorted for calibrating the damping magnet system.

It is another object of my invention to provide a damping magnet system wherein the magnetic path provided by the damping magnets approximates a circle.

It is a further object of my invention to provide a measuring instrument having a U-shaped supporting member for damping magnets, and means adjacent the free ends of the U-shaped member for adjusting the damping magnets.

It is a further object of my invention to provide a damping magnet assembly having adequate shielding against external magnetic fields.

Figure 2:
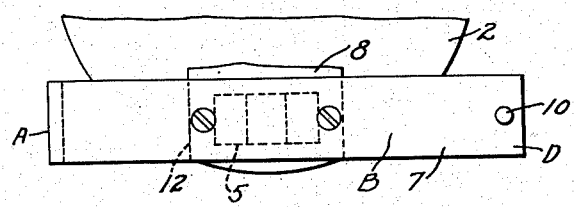

Other objects of my invention will be apparent from the following description taken in conjunction with the accompanying drawing, in which:

Figure 1 is a view in front elevation with parts in section, and with its cover removed, of a measuring instrument embodying my invention; and Fig. 2 is a detail view in top plan, with parts broken away, taken along the line II—II of Fig. 1.

Referring to the drawing, Fig. 1 shows an instrument having a stator 1 for rotating an armature which is rotatably mounted on the stator. This armature is illustrated as an electroconductive disc 2. The armature may be employed for actuating a suitable register 3 for integrating watthours or any other suitable quantity. Watthour meters and other instruments having the elements thus far described are well known in the art.

In a watthour meter, it is customary to apply to the armature 2 a torque dependent upon the voltage and current of an electrical circuit. If no provision were made for controlling the movements of the armature, the only resistance to rotation thereof would be that offered by the friction of the rotating armature assembly and of the register 3. Consequently, the watthour meter would be useless for measuring purposes.

In order to oppose movements of the armature by a torque which increases in accordance with the rotation of the armature, I provide a damping magnet assembly 4. This damping magnet assembly may consist of a single permanent magnet, but preferably I employ two permanent magnets 5 and 6 having legs terminating in pole faces adjacent the armature 2. Each pair of pole faces is connected by a yoke to form a substantially U-shaped permanent magnet. With such a damping magnet assembly the rate of rotation of the armature bears a linear relationship to the torque tending to rotate the armature.

For optimum results, the permanent magnet assembly should provide a magnetic path for a flux approaching a circle in form. Although the construction illustrated in Fig. 1 approximates a circle, it departs slightly from an exact circle in order to compensate for certain characteristics of damping magnets. It will be noted that the legs are slightly elongated to provide coercive force. Moreover, the cross-section of each permanent magnet increases from a predetermined value at each pole face to a larger value in the connecting yoke. This variation in cross-section is to compensate for leakage flux in the legs of each magnet. By properly varying the cross-section as indicated, the same flux density may be provided throughout the magnetic path. Suitable polarities for the magnetic pole faces are indicated on the drawing by the reference character N, which denotes a north pole, and S, which denotes a south pole.

For supporting the permanent magnets 5 and 6, I provide a supporting member 7, which is bent or folded at an intermediate point A, to provide a generally U-shaped or loop member having legs B and C terminating in free ends D and E. One of the legs B is supported by a bracket 8 which may be detachably mounted on the stator 1 by any suitable means, such as machine screws 9.

Adjustments for the permanent magnets are effected through the member 7 by means of an adjusting screw 10, which passes freely through an opening 11 in the free end E and projects into threaded engagement with the free end D. By reference to Fig. 1, it will be noted that when the screw 10 is rotated in one direction, the free ends D and E are forced towards each other to carry the permanent magnets closer together. Such movement results in an increase in damping flux threading the armature 2, and consequently increases the damping torque thereon. Conversely, a reverse movement of the screw 10 releases the free ends D and E and permits the permanent magnets to separate, thereby decreasing the amount of flux cutting the armature 2 and decreasing the damping torque thereon. Consequently, by a proper adjustment of the screw 10, the dimensions of the air gap between the permanent magnets 5 and 6 may be adjusted as desired.

It will be noted that actuation of the screw 10 deforms the member 7 and, in effect, tends to pivot the legs C and B about the point A. Because of the relative distance between the permanent magnets and the point A as compared to the distance between the screw 10 and the point A, any movement of the permanent magnet is greatly magnified at the screw 10. Consequently, fine adjustments of the magnets may be obtained. Preferably, the member 7 is constructed of a somewhat resilient material having a bias tending to urge the free ends D and E apart or together, depending upon the specific construction of the screw adjustment. In the form illustrated, the screw 10 urges the free ends together against the bias of the member.

The damping magnets 5 and 6 may be attached to the member 7 in any suitable manner. As illustrated, however, I prefer to substantially embed each of the damping magnets in a suitable shield 12 or 13. The embedding may be carried out in any desired manner. For example, the permanent magnet 5 may have the shield 12 formed by casting or molding a suitable material such as a zinc-base or an aluminum-base die casting alloy therearound. As a further example, the permanent magnet 6 may be inserted from the rear through openings cut in the shield 13 by suitable machining operations. The shields 12 and 13 in turn may be attached to the member 7 in any suitable manner, such as by machine screws 14.

It is believed that the assembly and operation of a damping magnet assembly designed in accordance with my invention is apparent from the foregoing description. After the damping magnets 5 and 6 have been formed of suitable material, such as one of the high-coercive magnet steels above referred to, they may be inserted in the shields 12 and 13 by suitable casting or machining operations. These shields, together with the magnets contained therein, are then attached to the member 7. The complete assembly, comprising the member 7, the shields and the permanent magnets, then is mounted on the stator 1 by means of the machine screws 9. Having completed the watthour meter assembly in this manner, the watthour meter may be tested in accordance with conventional practice. As is customary in the art, the watthour meter may be tested at its rated load and may be calibrated for accurate registration at this rated load by suitable manipulation of the adjusting screw 10. Once the correct calibration has been obtained, the damping magnet assembly may be removed and replaced as a unit without destroying the calibration. This greatly facilitates proper servicing of the watthour meter.

By suitable choice of the materials employed for the shields 12 and 13 and for the member 7, the permanent damping magnets 5 and 6 may be adequately shielded against both continuous and alternating external magnetic fields. For example, the member 7 may be constructed of a suitable magnetic material having a low coercive force or magnetic retentivity and having a reasonably high magnetic permeability. Typical materials for this purpose are soft steel and iron. When such material is employed for the member 7, continuous or low frequency external magnetic fields are by-passed through the member 7 away from the permanent damping magnets 5 and 6. Consequently, no variation in the magnetization of the damping magnets results.

If a material having reasonably high electrical conductivity is employed for the shields 12 and 13, the damping magnets 5 and 6 are shielded against alternating external magnetic fields especially high frequency fields. For this purpose, shields formed of a material, such as copper, and having adequate thickness (about .015 of an inch for copper) may be employed. By reference to Fig. 1, it will be noted that the damping magnets 5 and 6 are substantially embedded in the shields, only the pole faces thereof being exposed through the shields. Consequently, effective shielding against external alternating magnetic fields is provided.

Although I have described my invention with reference to certain specific embodiments thereof, it is obvious that numerous modifications thereof are possible. Therefore, I do not wish my invention to be restricted except as required by the appended claims when interpreted in view of the prior art.

I claim as my invention:

1. In a measuring instrument, an electro-conductive armature member, means mounting said electro-conductive armature member for movement, and means for damping movements of said armature member comprising damping magnet means, magnetic supporting means mounting said damping magnet means in position to establish a damping magnetic field in the path of movement of said electroconductive armature member, said magnetic supporting means being positioned to form a magnetic shield for said damping magnetic means, and electroconductive means closely surrounding a substantial portion of said damping magnet means for establishing a shield therefor against variable magnetic fields.

2. In a damping magnet assembly, a folded, substantially U-shaped, resilient member, said resilient member comprising a low-coercive, magnetic material, screw adjusting means associated with the legs of said U-shaped resilient member adjacent the ends of said legs, said screw means being effective for displacing said legs against the bias of said resilient member, and damping magnet means carried by said resilient member intermediate the ends of said legs and the fold in said resilient member.

3. In a damping magnet assembly, damping magnet means and means for supporting said damping magnet means, said supporting means including means for protecting said damping magnet means from demagnetization by alternating magnetic fields, and including means for protecting said damping magnetic means from external continuous magnetic fields.

4. In a damping magnet assembly, a pair of U-shaped damping magnets having pole faces opposed and spaced to define an air gap, a magnetic member substantially forming a loop around said damping magnets for shielding said damping magnets, and means securing each of said damping magnets to said magnetic member.

5. In a measuring instrument, an electroconductive armature disc, means mounting said armature disc for rotation, damping means for said armature disc comprising a first permanent magnet having pole faces adjacent a first face of said disc, a second permanent magnet having pole faces adjacent a second face of said disc, said permanent magnets forming a substantially circular path for magnetic flux passing therefrom through said disc, a non-magnetic, electroconductive shield substantially surrounding each of said permanent magnets, a low-coercive, magnetic shield forming substantially a loop around said permanent magnets for supporting said permanent magnets, and adjusting means for varying the dimensions of said loop and said circular path.

6. In a measuring instrument, an electroconductive armature disc, means mounting said armature disc for rotation, a damping unit for said measuring instrument comprising a substantially U-shaped ferro-magnetic member having legs extending over opposite faces of said disc, adjusting means associated with the free ends of said legs for varying the distance therebetween, a separate permanent damping magnet carried by each of said legs, each of said damping magnets having pole faces adjacent a separate face of said armature disc, said damping magnets cooperating to provide a substantially circular path for magnetic flux passing therethrough, and means for detachably attaching said damping unit to said mounting means.

7. In a measuring instrument, an electroconductive armature disc, means mounting said armature disc for rotation, a damping unit for said measuring instrument comprising a substantially U-shaped ferro-magnetic member having legs extending over opposite faces of said disc, adjusting means associated with the free ends of said legs for varying the distance therebetween, a separate permanent damping magnet carried by each of said legs, each of said damping magnets having pole faces adjacent a separate face of said armature disc, said damping magnets cooperating to provide a substantially circular path for magnetic flux passing therethrough, a separate electroconductive shield for substantially embedding each of said damping magnets, and means for detachably attaching said damping unit to said mounting means.

8. In a damping magnet assembly, a first, substantially U-shaped, high-coercive magnet having a first pair of pole faces, a second, substantially U-shaped, high-coercive magnet having a second pair of pole faces, and means mounting said magnets with said pairs of pole faces spaced to provide an air gap therebetween, said magnets cooperating to define a generally circular path for magnetic flux passing therethrough, and each of said magnets having a cross-section which increases from a predetermined value adjacent said air gap to a larger value distant therefrom.

THOMAS D. BARNES.